E. R. SHAHAN.
CONCENTRATOR.
APPLICATION FILED JAN. 19, 1916.

1,205,673.

Patented Nov. 21, 1916.
4 SHEETS—SHEET 3.

WITNESSES
INVENTOR
E. R. Shahan
BY
ATTORNEYS

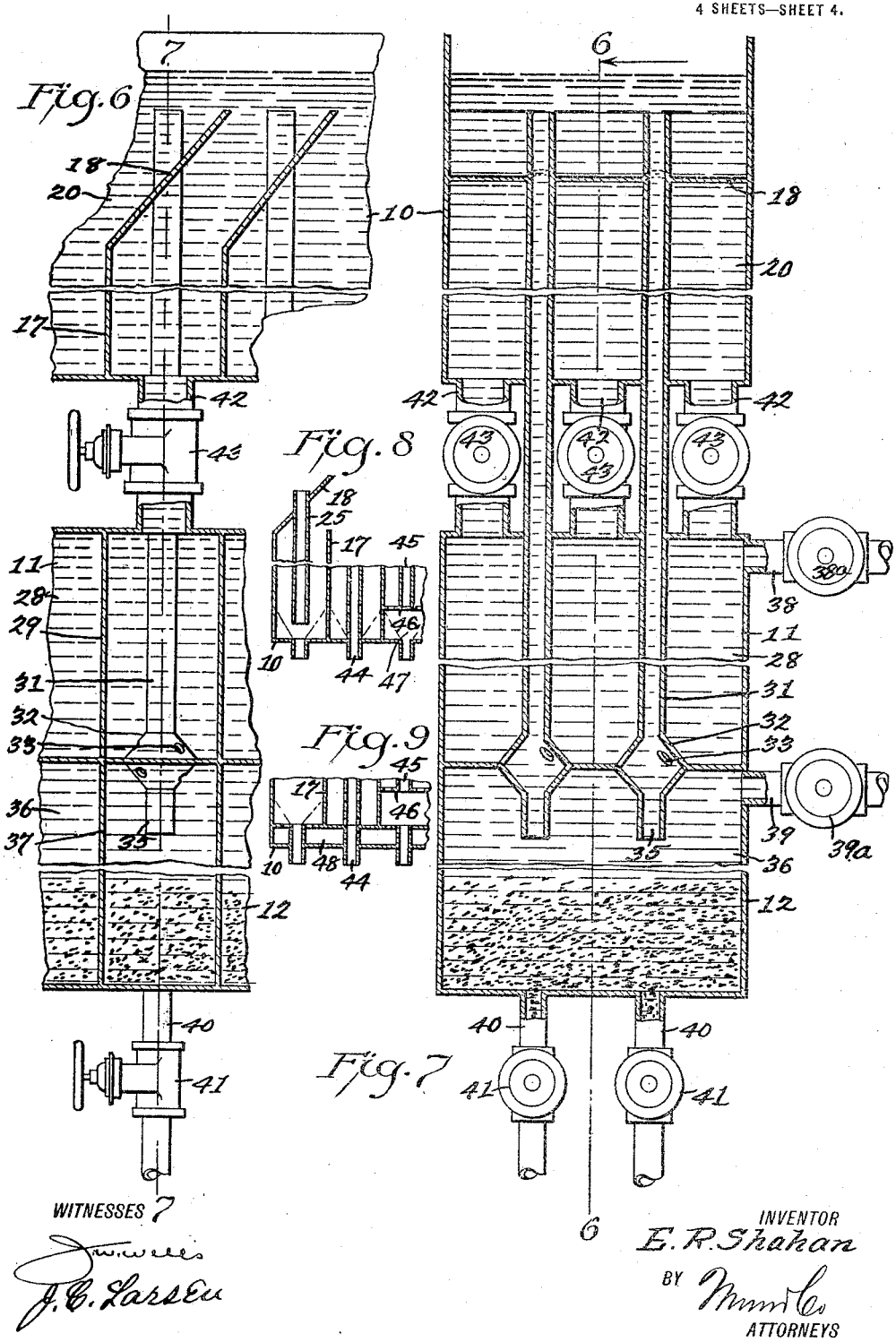

UNITED STATES PATENT OFFICE.

EVERETT RICHARD SHAHAN, OF ST. PAUL, MINNESOTA.

CONCENTRATOR.

1,205,673.　　　　　Specification of Letters Patent.　　Patented Nov. 21, 1916.

Application filed January 19, 1916. Serial No. 73,017.

*To all whom it may concern:*

Be it known that I, EVERETT RICHARD SHAHAN, a citizen of the United States, and a resident of St. Paul, in the county of Ramsey and State of Minnesota, have invented certain new and useful Improvements in Concentrators, of which the following is a specification.

My invention relates to the concentration of ores, and the main object thereof is to provide an apparatus wherein the flow of ore pulp in one direction is met by a flow of water, or water and air, in the opposite direction, said water or water and air being under sufficient pressure to remove the sludge from the pulp but not enough to prevent the settling of the concentrates.

My invention is fully described in the following specification, of which the accompanying drawings form a part, in which like characters refer to like parts in each of the views, and in which:—

Figure 1:
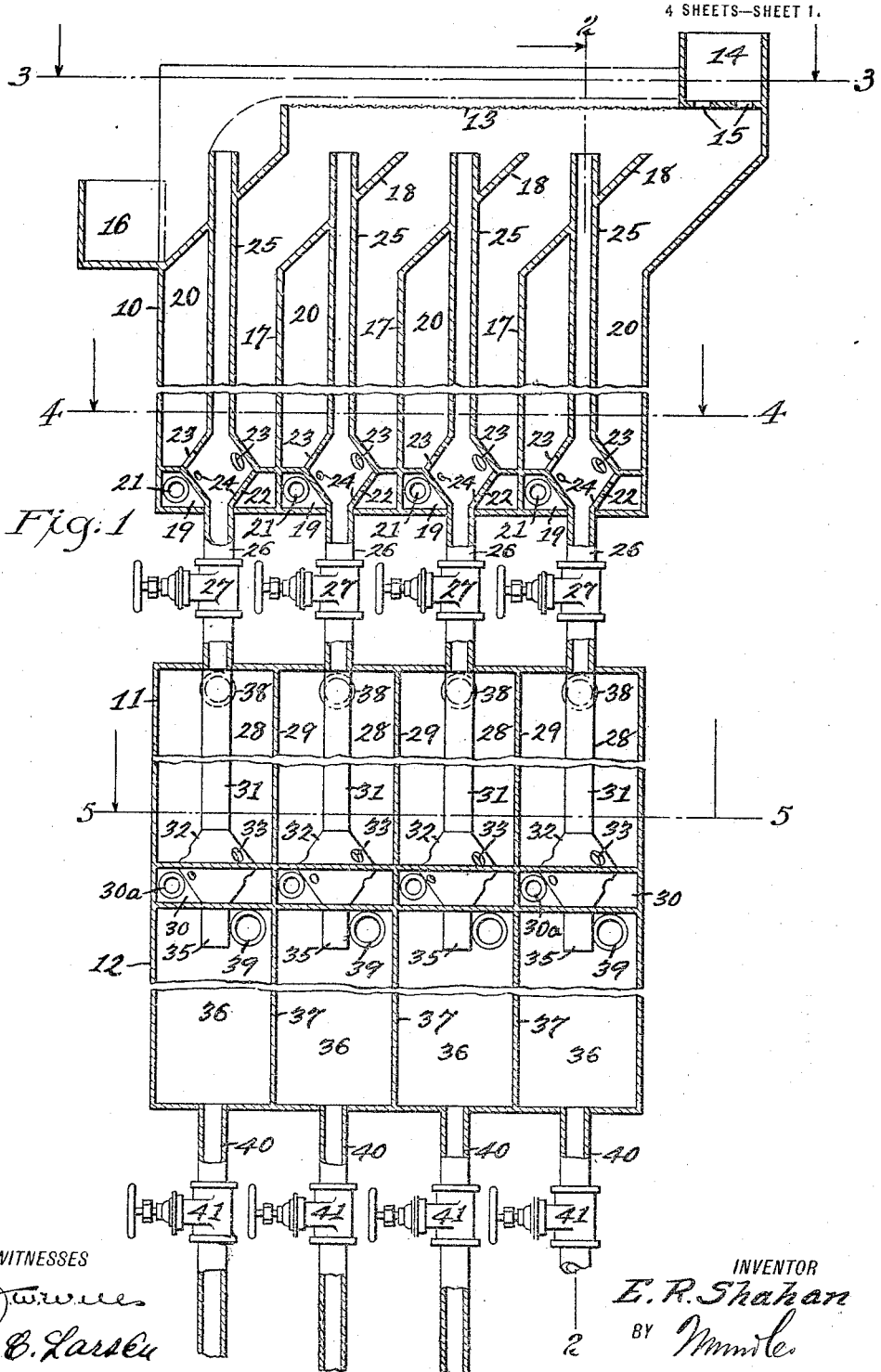
Figure 2:
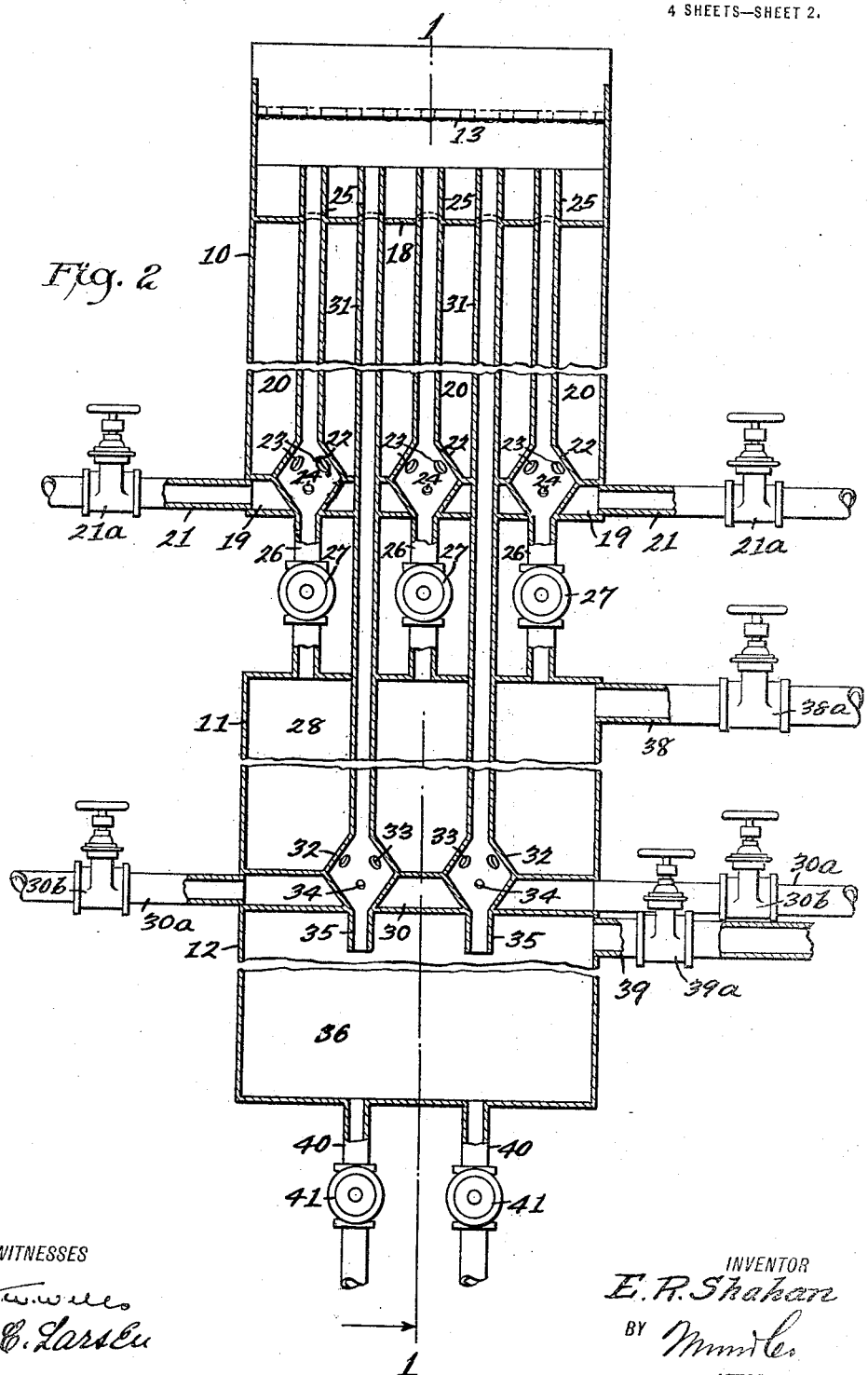
Figure 3:
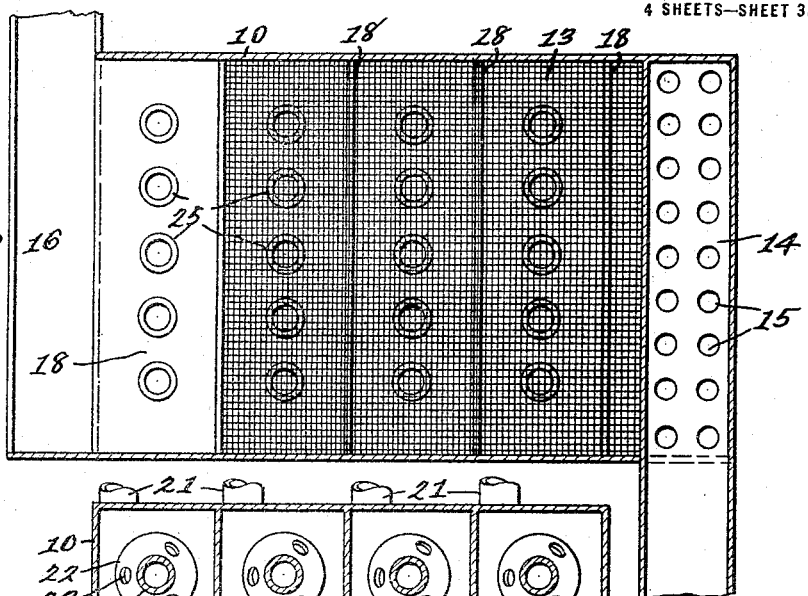
Figure 4:
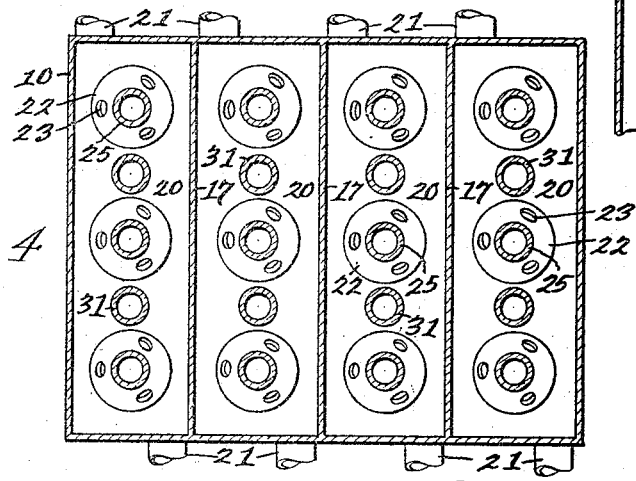
Figure 5:
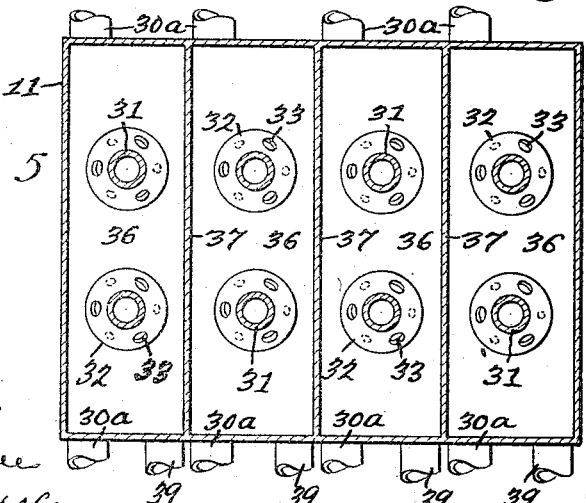

Figure 1 is a sectional view of one embodiment of my invention, taken on the line 1—1 of Fig. 2; Fig. 2 is a section taken on the line 2—2 of Fig. 1; Fig. 3 is a section taken on the line 3—3 of Fig. 1; Fig. 4 is a section taken on the line 4—4 of Fig. 1; Fig. 5 is a section taken on the line 5—5 of Fig. 1; Fig. 6 is a sectional view of a modified form of my invention, taken on the line 6—6 of Fig. 7; Fig. 7 is a section taken on the line 7—7 of Fig. 6; Fig. 8 is a fragmentary sectional view of another modification; and Fig. 9 is a similar view of still another modification.

In Figs. 1 to 5, inclusive, I have shown three superimposed tanks 10, 11, and 12, the first of which is open at its top and protected by a screen 13 to prevent the entrance of matter which might interfere with the operation of the apparatus, an ore feed box 14 being arranged over the tank 10 and provided with passages 15 in the bottom thereof, and a tailing launder 16 is arranged at the side of the tank 10. The tank 10 is divided into compartments by means of a plurality of vertical partitions 17 topped by inclined members 18 and is further provided with an air chamber 19 under each of the compartments 20 formed by the said partitions, an air pipe 21 leading to each chamber 19. A concentrating chamber 22 is arranged at the bottom of each compartment 20 consisting of a casing of any desired shape provided with passages 23 into the respective compartment and with passages 24 leading to the respective air chamber 19, a pipe 25 leading upwardly from each chamber 22 through the respective inclined partition member 18, and a pipe 26 leading downwardly through the bottom of the tank 10 from each concentrating chamber 22. The pipes 26 are provided, each, with a gate 27 and pass through the top of the tank 11, said tank being divided into compartments 28 by means of partitions 29, and I provide an air chamber 30 beneath each compartment 28, air supply pipes 30ª leading to said air chambers.

As shown in Fig. 2, I provide supplemental pipes 31 extending from a point below the top of the tank 10 downwardly through the bottom of this tank and into the tank 11 where they are connected with concentrating chambers 32 provided with passages 33 leading to the respective compartments 28 and with passages 34 leading to the respective air chambers 30, pipes 35 leading from these concentrating chambers through the top of the closed tank 12 which is also divided into compartments 36 by means of partitions 37. The tank 11 is provided with water supply pipes 38 adjacent its top, and the tank 12 is provided with water supply pipes 39 adjacent its top, the reason for placing these pipes near the tops of the tanks being in order to prevent their becoming clogged by the accumulation of pulp or concentrates, and the tank 12 is further provided with a draw-off pipe 40 having a grate 41 therein beneath each of the compartments 36. The air supply pipes 21 and 30ª are provided with gates 21ª and 30ᵇ, respectively, and the water supply pipes 38 and 39 are provided with gates 38ª and 39ª, respectively, whereby the supply and pressure of air and water is under control.

The ores in a pulp state are led through the feed box 14 to the open tank 10 and will settle to the bottom of the tank in the first compartment 20 and they will lodge around and above concentrating chamber 22 and will accumulate to the point where they overcome the pressure and stop the flow of water through passages 23; they will then settle through passages 23 into the chamber 22, where they are met by the upward flow of water or water and air under pressure whereby the sludge is removed from the pulp and elevated through the passage 25 and discharged in the adjoining compartment 20, while the concentrates will settle through the passage 26 to the tank 11 against the flow of water under pressure from the supply pipe 38, and will then settle to the bottom of the tank and lodge around and above the concentrating chamber 32 and will accumulate to the point where they overcome the pressure and stop the flow of water through the passage 33; they will then settle through the passages 33 into the chamber 32 where they are met by the upward flow of water whereby any sludge remaining in the concentrates will be removed and elevated through the passage 31 and discharged in the adjoining compartment 20, while the concentrates will settle through the passage 35 to the tank 12 against the flow of water under pressure from the supply pipe 39, whence they may be removed through the pipes 40 whenever desired. This operation is to be repeated throughout each compartment until the sludge is finally discharged through the pipes 25 and 31 into the tailing launder. It is intended, when desired, to gradually reduce the water pressure for each compartment.

The advantages of this device are that it provides a means where all the ingredients of the ores may be concentrated and classified according to their specific gravities or masses, that the ores may be treated as often as desired, and this result is accomplished without any loss of elevation whether treated once or a multiple of times. The upward flow of water under pressure through the pulp with velocity sufficient to remove the sludge while permitting the concentrates to settle will be confined to the vertical pipe passages and concentrating chambers. The upward flow of water through the passages 25 or 31 will have sufficient velocity to elevate all sludge rejected at the passage 26 or 35. The upward flow of water from the passage 26 or 35 into the chamber 22 or 32 will find an outlet along the lines of least resistance. For this reason the casing forming each concentrating chamber is shaped to direct the flow toward the passages 25 or 31 and is placed directly above the respective passages 26 or 35 so that the upward flow of water is directed through the respective chambers 22 or 32 and into the respective passages 25 or 31, without change of direction.

The passages 25 and 31 are provided by vertical pipes which present no place where sludge may accumulate and check the flow, so that sludge within the passages will always be suspended in the water. The discharge of passage 25 or 31 is placed below the surface of the water in the tank 10, the passages 25 being equal in area to the passages 26, and the passages 31 being equal in area to the passages 35. This arrangement has the advantage of causing a minimum pressure or flow of water to be directed through the passage 23. A minimum head of water is required to create the upward flow of water through the passages and concentrating chambers with velocity sufficient to elevate the sludge. The upward flow is insured and a free passage is insured by the pressure of water to be carried in the supply main, assisted when employed by air under pressure.

The quantity of water required to operate when flowing through the larger area of tanks or compartments of the tanks will circulate slowly and will be reduced to a minimum velocity and will offer but little resistance to the settling of ores in a pulp state. The discharge from the passages 25 and 31 near the surface of the water in the tank 10 and the discharge upward toward the surface has the advantage of creating only a minimum circulation within the tank 10. All water discharged within the tank 10 will overflow into the tailing launder. Any sludge fine enough to be suspended by this slow moving current will be carried by it into the tailing launder. However, it is intended that the area of the tank 10 shall be sufficient to retain any part of the ore in a pulp state that would settle in practically quiet water. The pulp is subjected to this water or water and air action from the time of entering the tank 10 to the time that the concentrates reach the bottom of the tank 12 or is discharged as sludge into the tailing launder from the last compartment. By means of the several gates the water supply and the air supply are under control and the downward movement of the pulp or concentrates is also under control.

By using water pressure in the closed tank 12, the concentrates are forced through the outlet 40 more quickly and in a drier state than they would be drawn from an open tank. By only using air under pressure substituted for water under pressure and supplied through the pipes 38 or 39, a separation of dry materials other than ores, such as grain, seeds, etc., may be made, and, if desired, the water supply pipes may be connected directly to the pipes 26.

The modification shown in Figs. 6 and 7 dispenses with the air chambers and the air supply pipes, and also with the concentrating chambers 22, the pulp settling against the action of the water passing upwardly through pipes 42 connecting the tanks 10 and 11, said pipes having gates 43 for controlling the settling of the pulp into the tank 11 where it accumulates around the concentrating chambers 32 and is acted upon as already described in the passage thereof to the tank 12.

In Fig. 8 is shown a modified form wherein the concentrating chambers are dispensed with, the pipes carrying the water upwardly being perforated near the bottom of the tank 10 to allow the pulp to pass into said pipes against the water flow, these pipes being shown at 44, and I may also provide imperforate pipes 45 resting upon a perforated plate 46 arranged over each of a plurality of chambers 47, the action of the water being the same as already described.

The modification shown in Fig. 9 is similar to that shown in Fig. 8 with the difference that I employ the air chambers 48 not shown in Fig. 8, whereby both water and air under pressure may be used, or air only.

My invention consists in the provision of means for permitting a downward movement by gravity of pulp against a water, water and air, or air, pressure which tends to separate the sludge from the concentrates and carry the sludge out of the apparatus, and I do not desire to limit myself to any particular structure for accomplishing this result, although I have shown several preferred embodiments of the invention.

Having fully described my invention, what I claim as new and desire to secure by Letters Patent, is:—

1. A concentrator, comprising an open tank for receiving ores in a pulp state, a supplemental tank thereunder, pipes connecting said tanks, and having, each, an enlarged chamber having a perforated top, and water supply pipes adjacent the upper side of said supplemental tank to provide an upward flow of water through the pulp to remove the sludge while permitting downward movement of the concentrates to said supplemental tank.

2. A concentrator, comprising an open tank for the reception of ores in a pulp state, a closed supplemental tank thereunder, pipes joining said tanks, and having, each, an enlarged chamber having a perforated top, a third closed tank beneath said supplemental tank, pipes connecting said two last named tanks, water supply pipes adjacent the top of said two last named tanks, and draw-off pipes for said third tank, said water supply pipes being adapted to provide an upward flow of water through the pulp under pressure to remove the sludge while permitting the concentrates to settle.

3. A concentrator, comprising an open tank for the reception of ores in a pulp state, a closed tank thereunder, partitions dividing said tanks into compartments, pipes connecting the respective compartments of said tanks, and having, each, an enlarged chamber having a perforated top, and water supply pipes for said closed tank to provide an upward flow of water through the pulp under pressure to remove the sludge while permitting the concentrates to settle.

4. A concentrator, comprising an open tank for the reception of ores in a pulp state, a closed tank thereunder, perforated pipes arranged in vertical position in said open tank, pipes connecting said perforated pipes with said closed tank, and water supply pipes for said closed tank to provide an upward flow of water through the pulp under pressure to remove to the sludge while permitting the concentrates to settle.

5. A concentrator, comprising an open tank for the reception of ores in a pulp state, a closed tank thereunder, pipes connecting said tanks, a perforated concentrating chamber at the upper end of each pipe, within said open tank, a pipe leading upwardly from each concentrating chamber, and water supply pipes for said closed tank to provide an upward flow of water through the pulp under pressure to remove the sludge while permitting the concentrates to settle.

6. A concentrator, comprising an open tank for the reception of ores in a pulp state, a closed tank thereunder, pipes connecting said tanks, a perforated concentrating chamber at the upper end of each pipe, within said open tank, a pipe leading upwardly from each concentrating chamber, a third tank beneath said closed tank, a plurality of concentrating chambers connecting said closed and third tanks, a pipe leading upwardly from each of said last named concentrating chambers toward the top of said open tank, and water supply pipes for said closed and third tanks to provide an upward flow of water through the pulp to remove the sludge while permitting the concentrates to settle.

7. A concentrator, comprising an open tank for the reception of ores in a pulp state, a closed tank thereunder, pipes connecting said tanks, a casing serving as an air chamber at the bottom of said open tank, air supply pipes therefor under pressure, a casing at the upper end of each of said pipes having perforations leading to said open tank and perforations leading to said air chamber, a pipe directed upwardly from each perforated casing, and water supply pipes for said closed tank to provide an upward flow of water through the pulp to remove the sludge while permitting the concentrates to settle.

8. A concentrator, comprising an open tank for the reception of ores in a pulp state, partitions therein dividing said tank into compartments, an inclined member on each partition, a perforated casing at the bottom of each compartment serving as a concentrating chamber, a pipe led upwardly from each casing, a closed tank beneath said open tank, partitions dividing said closed tank into compartments, pipes connecting said casings with the respective compartments of said closed tank, and water supply pipes for the compartments in said closed tank to provide an upward flow of water through the pulp to remove the sludge while permitting the concentrates to settle.

In testimony whereof I have signed my name to this specification in the presence of two subscribing witnesses.

EVERETT RICHARD SHAHAN.

Witnesses:
FRED SOMMERS,
G. J. KIPP.